United States Patent [19]

Zahid

[11] 4,295,492

[45] Oct. 20, 1981

[54] LOW COST ACCUMULATOR DEVICE

[75] Inventor: Abduz Zahid, Los Angeles, Calif.

[73] Assignee: Greer Hydraulics, Incorporated, Chatsworth, Calif.

[21] Appl. No.: 93,624

[22] Filed: Nov. 13, 1979

[51] Int. Cl.[3] .............................................. F16L 55/04

[52] U.S. Cl. .................................... 138/30; 220/85 B

[58] Field of Search .................. 138/26, 30; 220/85 B

[56] References Cited

U.S. PATENT DOCUMENTS 2,339,876 1/1944 Phillips ................................ 138/30

2,880,759 4/1959 Wisman ................................ 138/30

3,115,162 12/1963 Posh ..................................... 138/30

3,259,147 7/1966 Mercier et al. ...................... 138/30

FOREIGN PATENT DOCUMENTS 2821671 11/1979 Fed. Rep. of Germany ........ 138/30

*Primary Examiner*—James E. Bryant, III

*Attorney, Agent, or Firm*—Arthur B. Colvin

[57] ABSTRACT

The present invention is directed to a low cost accumulator device having a pressure vessel formed of two components, namely, a shell and a cap, the seal between the shell and cap being effected in the course of mounting the shell to the cap by compression of a thickened rim portion of the bladder between the shell and cap components, the apparatus being so constructed and arranged that optimum compression of the rim portion is automatically achieved, thereby avoiding under-compression with possible resultant leaks or over-compression with possible damage to the bladder.

4 Claims, 2 Drawing Figures

LOW COST ACCUMULATOR DEVICE

BACKGROUND OF THE INVENTION

1. Field of the Invention

The present invention is in the field of accumulator devices and pertains more particularly to a low cost accumulator device intended particularly to operate at relatively low pressures, e.g. up to about 250 psi.

2. The Prior Art

The use of accumulator devices is progressively increasing, such device being employed either as an energy storage device or as a pulsation dampener. However, the cost of providing a reliable and efficient accumulator has hindered the more widespread use of this apparatus.

Accumulators typically are comprised of a pressure vessel having a gas charging port at one end, within which there is disposed a gas charging valve assembly, and an oil port at the other end connected to hydraulic fluid under pressure.

A bladder is interposed between the parts, dividing the vessel into two chambers. The chamber in communication with the gas port is charged with gas under pressure whereby the bladder is caused to line the interior of the vessel and close the oil port. When pressures encountered in the hydraulic system exceed the pressure in the gas chamber, liquid is caused to flow into the oil or liquid chamber of the vessel, deflecting the bladder inwardly and increasing the pressure on the gas in the gas chamber. Energy is thus stored in the compressed gas, which energy is released to the system when the pressure in the fluid line falls below the pressure in the gas chamber.

Heretofore, accumulator devices of the type described have typically been formed of cast or forged metal shells or metal shells which are spun to a desired configuration. After mounting of the bladder assembly, a step which typically involves welding of a bladder retainer member, the pressure vessel is completed by the addition of a cap.

The cap is typically mounted either by interthreading the same with the open mouth portion of the shell previously referred to, or by welding the same at an annular weld line to the pressure vessel. One or more O-ring configurations are usually interposed between the cap and shell to assure against leakage under the high pressures involved.

The above described assembly procedures are merely representative and various attempts have been made to provide means which will accomplish the end of providing an effective seal securely capping the pressure vessel shell and securely supporting the bladder in a desired position, all at low cost. As examples of alternative means for completing the formation of the pressure vessel reference is made to U.S. Pat. No. 3,066,699, of Dec. 4, 1962—Peet; No. 3,138,176 of June 23, 1964—Mercier; No. 3,139,112 of June 30, 1964—Mercier and No. 3,788,358 of Jan. 29, 1974—Taki.

The noted references, and perhaps others, disclose the concept of utilizing portions of the bladder as a means for sealing the metallic components of a pressure vessel and also as a means for supporting the bladder at a desired position within the pressure vessel.

SUMMARY OF THE INVENTION

The present invention may be summarized as directed to a low cost accumulator device characterized by simplicity of manufacture whereby mounting of the bladder and sealing of the two metallic components defining the pressure vessel are accomplished in a single, simple operation. The possibility of damage to the bladder is minimized or eliminated.

More particularly, the apparatus of the present invention is comprised of a pressure vessel including a shell having an upwardly facing open mouth portion, about the periphery of which is arrayed an upwardly directed trough or groove having a peripheral upwardly directed skirt.

A cap member is provided, the outer peripheral portion of which includes a downwardly directed trough or groove, the outermost peripheral portion of the cap member including a downwardly directed skirt. The outer wall portions of the skirt of the cap intimately engage the inner wall portions of the skirt of the shell.

The bladder assembly includes a thickened rim adapted to be seated between the juxtaposed troughs or grooves.

After the cap member is positioned, the skirt of the shell is formed inwardly, as by a spinning operation, whereby the respective troughs or grooves of the shell and cap are brought closer together, defining a chamber within which the thickened rim portion of the bladder is captured, the chamber including an annular opening for side wall portions of the bladder.

An important feature of the invention lies in the fact that the skirt of the cap, in the course of spinning, bottoms against the floor of the trough of the shell, defining a limited amount of axial inward movement of the cap whereby the degree of compression applied to the rim of the bladder is accurately controlled to assure optimum sealing without damage to the bladder.

Accordingly, it is an object of the invention to provide a low cost pressure accumulator device.

A further object of the invention is the provision of a device of the type described which includes a shell having an open mouth, a cap, the shell and cap together defining an annular chamber within which is captured the thickened rim portion of a bladder, the device being characterized by the terminal size of the chamber being preset as a result of interfit of the parts.

To attain these objects and such further objects as may appear herein or be hereinafter pointed out, reference is made to the accompanying drawings, forming a part hereof, in which.

Figure 1:
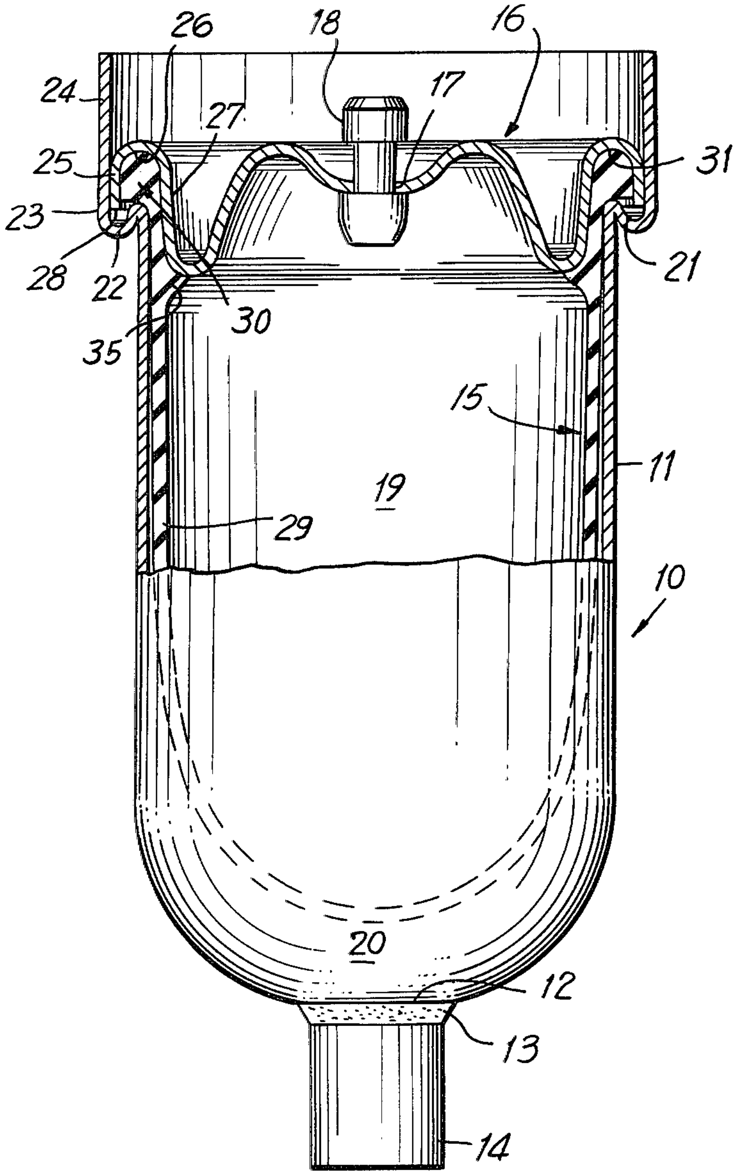
FIG. 1 is a side elevational view, partially in section, of an accumulator device prior to assembly.

Referring now to FIG. 1, there is disclosed an accumulator device 10 which is essentially conventional in its functional operation, the accumulator device including a shell portion 11 having an oil port 12 at the lower end thereof, the oil port 12 being connected, as by weld 13, to a fitting 14 forming a portion of a hydraulic system. Preferably a perforate screen (not shown) is secured within the vessel over the oil port to prevent extrusion of the bladder assembly 15 through the oil port.

The pressure vessel, in addition to the shell 11, includes a cap assembly 16 having a gas charging port 17 formed therein, a gas charging valve assembly 18 being secured, as by welding or the like, within the port 17.

As is conventional, the bladder assembly 15 divides the interior of the pressure vessel into two chambers, a gas chamber 19 between the bladder and the gas charging port 17, and an oil chamber 20 between the bladder and the oil port 12.

In accordance with the invention, the shell member 11 includes an open mouth portion 21 surrounded by an upwardly facing trough 22 integrally formed with the shell 11, as by reverse bending. The outer wall portion 23 defining the trough includes as an upward continuation an annular skirt member 24.

The cap member 16 includes an outermost peripheral skirt portion 25, the outer circumference of which provides an intimate fit with the inner circumference of the skirt portion 24 of the shell.

The cap member 16, immediately inwardly of the skirt 25, includes a downwardly directed trough 26, the trough 26 including an inner annular wall portion 27 which is spaced from the open mouth portion 21 by a predetermined selected clearance distance. The skirt 25 of the cap member terminates in a downwardly directed annular lip 28.

The bladder assembly 15, which is formed of a resilient elastomeric material, includes a distensible lower portion 29 and a thickened rim portion 30 which functions both to provide a seal and to provide a mounting means for attachment of the bladder assembly to the pressure vessel. More particularly, the thickened rim portion 30 defines an open mouth portion of the bladder, the uppermost end of the rim including a semi-circular portion 31 which intimately fits within the trough 26 of the cap.

It will thus be evident that portions of the thickened rim 30 of the bladder assembly 15 will overlie the upwardly facing trough 22 of the shell 11.

Figure 2:
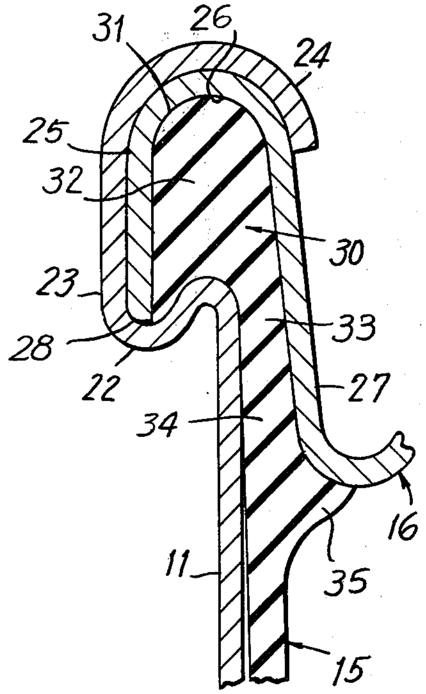
FIG. 2 is a magnified fragmentary sectional view of the junction between the pressure vessel elements after the forming process has been concluded.

Assembly of the parts is effected by first mounting the rim 30 of the bladder within the trough 26 in the cap member and thereafter sleeving the cap member axially downwardly into the interior of the shell to the position shown in FIG. 1. With the parts positioned as shown in FIG. 1, the skirt portion 24 is spun inwardly over the portions of the cap defining the trough 26 to the position shown in FIG. 2, which inward spinning operation, at least toward the terminal portions thereof, is accompanied by a downward axial compressive force on the skirt.

As a result of the application of the forces of aforesaid during the spinning operation, the cap member will be further urged axially inwardly of the shell 11 to an inward limiting position whereat the lip 28 of the skirt 25 of the cap bottoms against a floor portion of the trough 22 formed about the open mouth portion 21. When such metal-to-metal contact is achieved, it will be evident that the components will be disposed at an inward limiting position and no further relative movement will be possible. It is thus clear that a controlled compression of the thickened rim portion 30 of the bladder assembly is achieved.

After the spinning operation, the troughs 22 and 26 define therebetween an annular chamber 32 within which is captured the thickened rim of the bladder assembly.

An annular passage 33 is defined between the side walls of the shell and the wall 27 of the cap, the connector portions 34 of the bladder assembly extending into the interior of the pressure vessel through this passage.

Preferably the bladder assembly may include an inwardly directed annular rib 35 which underlies portions of the cap assembly 16 beneath the wall 27, it being apparent that pressure within the gas chamber of the vessel tends to press the lip upwardly. The wall portion 27 is preferably tapered inwardly toward the axis of the vessel whereby, upon axial movement of the cap in the course of the spinning operation, a degree of compression is induced in the connector portion 34 lying inwardly adjacent the wall 27.

It will thus be apparent that an effective seal between the metallic cap member and the metallic shell member is produced by the inward spinning of the skirt 24 over portions of the cap member 16, which portions act as a mandrel.

It is further apparent that by appropriately selecting the dimensions of the components and by providing a metal-to-metal stop engagement between the cap member and the skirt, such stop being provided illustratively in the illustrated embodiment by the engagement of the lip 28 against trough 22, the degree or amount of compression is positively controlled thereby, assuring predictable and repeatable results.

From the foregoing it will be seen that there is disclosed in accordance with the present invention an improved low cost accumulator device which may be assembled by a spinning operation not involving any welding steps, and wherein the mounting of the bladder and the formation of the seal are achieved as a result of the spinning operation. The risk of over- or under-compression of the seal, with consequent damage to the bladder or leakage at the seal junction is minimized or eliminated by the metal-to-metal contact aforesaid.

It will be evident to those skilled in the art and familiarized with the instant disclosure, that variations may be made in details of the illustrated embodiment without departing from the spirit of the invention. Accordingly the invention is to be broadly construed within the scope of the appended claims.

Having thus described the invention and illustrated its use, what is claimed as new and is desired to be secured by Letters Patent is:

1. An accumulator device including a pressure vessel having an oil port at one end, and a gas charging port at the other end, and a resilient elastomeric bladder therein and dividing the same into two chambers in communication, respectively, with said oil and said gas ports, said pressure vessel being of a two part construction and comprising a generally cylindrical shell having a closed end carrying said oil port and having an open mouth portion, an upwardly directed annular trough member surrounding said mouth portion, said trough including a floor, a cylindrical skirt surrounding said trough, a circular cap member carrying said gas charging port mounted in said open mouth portion of said shell, said cap member including a downwardly facing surrounding annular trough member having a depending peripheral annular lip, said cylindrical skirt being spun inwardly over the trough defining portions of said cap member whereby said annular lip of said cap is biased into engagement with said floor of said upwardly directed trough member, said trough members together defining an annular chamber having an annular opening directed toward the interior of said vessel, said bladder assembly including a thickened rim portion maintained in compressed condition within said annular chamber and providing a seal between said cap and the open mouth portion of said shell, said bladder having side wall portions extending through said annular opening into the interior of said shell.

2. An accumulator in accordance with claim 1 wherein said cylindrical skirt is disposed in outwardly lapping position of said cap member and retains said lip in engagement with said floor.

3. An accumulator in accordance with claim 2 wherein said cap member includes a depending peripheral wall portion in intimate engagement with the inner surface portions of said skirt, the lowermost end of said wall portion defining said lip.

4. An accumulator in accordance with claim 3 wherein portions of said thickened rim immediately inwardly of said annular chamber are biased against portions of said shell adjacent said open mouth portion and proximately spaced wall portions of said cap member.

* * * * *